Feb. 28, 1950 S. M. STAFFORD 2,498,721
HOB
Filed June 7, 1945
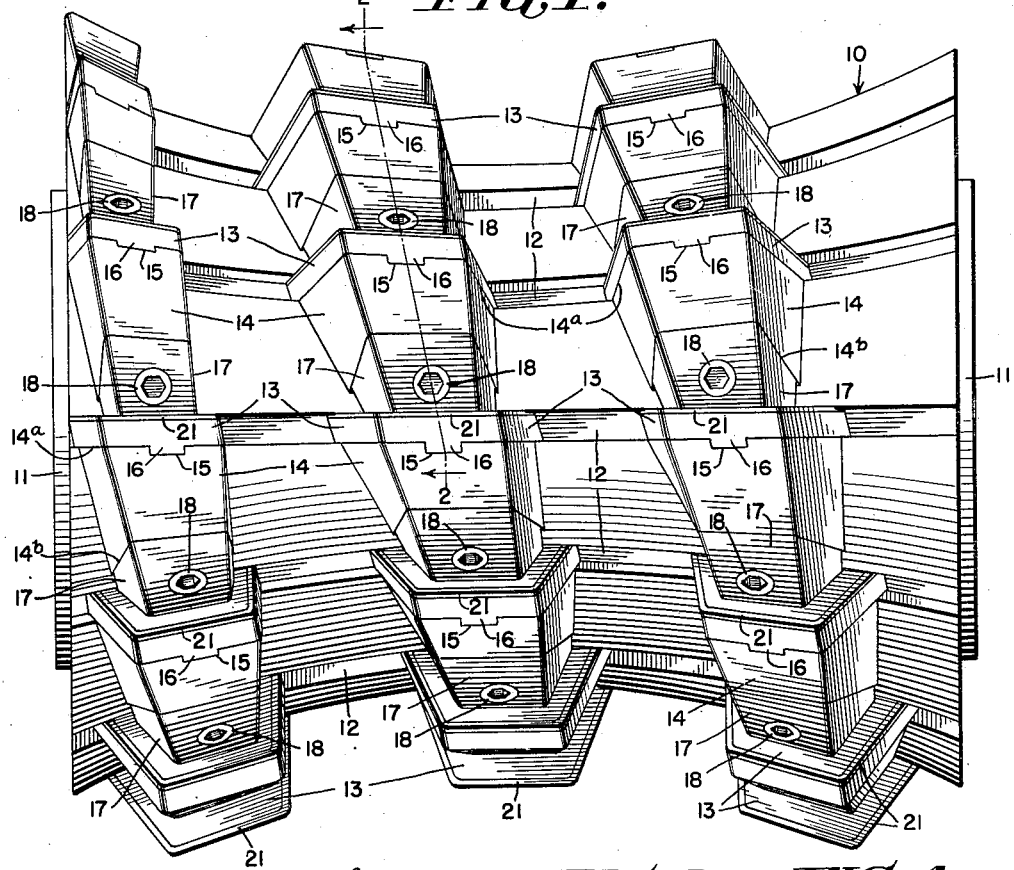
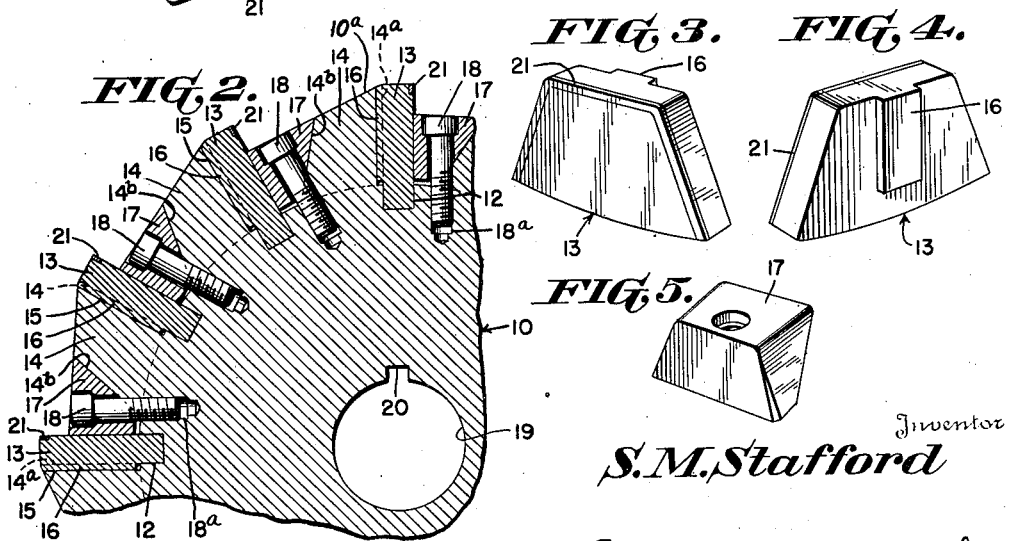
Inventor
S. M. Stafford
By Ralph L. Chappell
Attorney Patented Feb. 28, 1950

2,498,721

UNITED STATES PATENT OFFICE 2,498,721

HOB

Stephen M. Stafford, Washington, D. C.

Application June 7, 1945, Serial No. 598,188

1 Claim. (Cl. 29—105)

(Granted under the act of March 3, 1883, as amended April 30, 1928; 370 O. G. 757)

This invention relates to a hob for use in the cutting, manufacturing or processing of precision gears, generally of the type used in train and elevation drives in ordnance, construction equipment and heavy industry.

In the prior practices of cutting gear teeth, manufacturing procedures have necessitated the use of cylindrically shaped hobs and fixed teeth which form an integral part of the composite hob or cutting tool structure. The disadvantages appurtenant to the use of this type of machine tool lay in the fact that it entailed a slow production step as well as substantial overhead expenses and waste. An injury to one tooth, for example, rendered the hob or cutting tool useless for further precision gear cutting work. This waste and expense was due to the fact that the regrinding of the cutting members obviously caused the loss of the original dimensions and shape of the hob.

An object of my invention is to produce or manufacture a hob that may be used in cutting gears at a high rate of speed, and which is formed to accommodate the work or material to be processed.

A further object is to provide any conventional or special hob or cutting tool for the use of the manufacture of gears having high speed replaceable cutting members.

These and other objects will be apparent from a study of the following specifications, in which:

Fig. 1 is a front view of the hob or cutting tool;

Fig. 2 is a quartered cross-sectional end view, taken on line 2—2 in Fig. 1, showing the hob or cutting tool body, the Carboloy-faced cutting teeth, the securing wedges and the holding-down lugs or Allen screws;

Fig. 3 is an isometric front view of a replaceable cutting tooth, showing the working or cutting edge;

Fig. 4 is an isometric rear view of a replaceable cutting tooth, showing its vertical positioned key guide or retainer, and Fig. 5 is an isometric view of the wedge V-block retainer, showing an orifice adapted to receive a holding-down lug or screw.

Referring to Fig. 1, the hob or cutting tool is constructed of any suitable material, such as, phosphorus bronze, carbon steel, etc., and includes a generally cylindrical body 10 which decreases gradually and uniformly in diameter from its ends to its central portion. At each end of the body 10 is a protective flange or shoulder 11, the function of which is to permit the proper assembly of the hob or cutting tool on a milling machine spindle (not shown) in such manner as to enable the proper setting of center distances as well as to check the concentrical trueness of the hob when mounted on a high speed spindle.

The hob or cutting tool body 10 is provided with radial channels 12 parallel to the axis of the body and of suitable depth to accommodate the base of a removable Carboloy-faced cutting tooth 13. In addition, the hob or cutting tool is provided with circumferentially spaced extended supporting cogs 14 at the lagging edges of the respective channels 12, each cog having an angular peripheral surface which slopes inwardly from its leading edge. This slope includes a primary or slightly inclined portion 10a immediately next to the leading edge, which portion is substantially normal to the radial leading surface of the posterior cog. The peripheral faces of the cogs 14 are equidistant from the axis of the hob body 10. Each cog 14 has a leading surface 14a parallel to the radius at the center of the adjacent channel 12. The rear face 14b of each cog, while cut nearly parallel to the forward or leading surface 14a of the cog, is inclined at approximately thirty degrees to the adjacent surface 14a of the next lagging cog, giving said surface a sharp decline to its juncture with the periphery of the body 10 at a point spaced forwardly of the posterior channel. This angular disposition is due to the circumferential setting of the cogs on the periphery of the tool body 10. It is also pointed out that these cogs form an integral part of the hob or cutting tool body 10, and each cog is provided with a generally radial slot or channel 15 in its leading surface 14a to receive the vertical key or guide 16 of the removable cutting member or tooth 13. The teeth 13 are secured in positions mathematically predetermined for the cutting of a particular gear, by means of wedges 17, which are positively secured to the hob body 10 through the use of suitably countersunk securing means, for example the screws 18. These screws penetrate loosely through the wedges 17 and are screwed tightly into position in threaded openings 18a in the hob body 10. As shown in Fig. 2, the depth of each wedge is less than the radial depth of the declivity thereby providing a clearance which accommodates the riding of the wedge down the declivity when performing a setting. The screw by means of which the setting is done goes through a smooth hole in the wedge, which is sufficiently oversize to provide a circumferential clearance. The head of the screw is the sole occupant of a countersink of the hole, which like the shank of the screw also has a circumferential clearance around it. Said head bears directly on the bottom of the countersink thereby to impart the thrust of the screw directly to the wedge and not to any intermediary.

It will be apparent that the teeth or cutting members 13 are secured against lateral movement by their placement in the channels 12 and by the wedges 17, and are secured against axial movement by the engagement of the keys or guides 16 with the slots or channels 15 in the cogs 14. Also, when the screws 18 are tightened, the cam reaction between the sharply defined surfaces 14b of each of the cogs and the adjacent surfaces of the respective wedges 17 and the room provided by the looseness of the wedges causes the latter to be pressed tightly against the teeth 13 to prevent outward movement of the teeth. Thus, the assembly enables high speed spindle rotation of the tool without a concurrent danger of the teeth coming loose or a loss of concentricity due to centrifugal motion.

As the particular gear cutting hob shown in Fig. 1 is for use in the manufacture of precision gears, it is necessary for the cutting members 13 and their wedges 17 to be spirally set on the hob body 10 at a predetermined angle and distance, in order to properly machine laterally bedded circular members. This setting of the parts may be determined through mathematical computations and is dependent on the gear to be cut.

Referring to Fig. 2, it will be seen that the hob or cutting body 10 is provided with an axial hole 19 having a rectangular slot or keyway 20. This opening is provided in the tool body to receive the spindle and spindle key or guide on any "automatic" machine such as a milling machine or gear hobbing machine.

The teeth 13 are mounted with an open or protruding lead or cutting surface as may be required to permit the proper chip clearance adjacent to all cutting edges. However, the teeth or cutting members are fully supported on their rear surfaces by means of the cogs 14 which taper back to the similarly tapered wedges 17, thus permitting each tooth to have the aforementioned open cutting surface as may be required for the necessary chip clearance.

Referring to Figs. 3 and 4, the hob tooth or cutting member 13 is shown with its Carboloy working edges 21 about the top and sides of the forward faces. While the Carboloy element is expensive, it need only be mounted on the leading cutting edges of the tooth, as its use at these points enables continued high speed gear operations to be performed without any injury to the tool or any sacrifice of the required tolerance. The mounting of the leading Carboloy cutting edges 21 on the face of each tooth 13 is accomplished by means of the conventional process known as brazing. It will be noted that the tooth key or guide 16 is formed to engage only the adjacent supporting cog 14 and does not engage the walls of channels 12 or any element below the mean surface of the outer periphery of the hob or cutting tool. While the key or guide 16 could be extended to engage these elements, such a design would weaken the structure of the tool body 10 and render difficult the teeth assembly and disassembly operations.

Referring to Fig. 5, the provision of the hole or orifice in the wedge 17 through which the shank of the lug or Allen screw 18 passes is to permit ready assembly of the wedge in cooperation with the teeth 13 and the cogs 14 on the hob body. The lug retaining means 18 must not protrude above the tapered top face of the wedge 17, as such an assembly would tend to interfere with the operation of the cutting tooth and reduce the required chip clearance.

In the operation and use of my invention, the hob is mounted on the spindle of a conventional milling machine or gear hob machine and operated in the usual manner, the required cuts being predetermined.

The speed at which the hob may be rotated on the spindle is limited to that of the machine on which it is mounted. It will be appreciated that my invention may be utilized in the production of all types of gear wheels requiring close tolerances in their construction, but that individual mathematically computed settings of the teeth 13 must be made for each size or type of gear to be cut.

In the event a hob tooth or cutting member 13 is broken or nicked, it may be removed and repaired or wholly replaced without impairing the accuracy or alignment of the gear cutting hob. In the event a tooth is sharpened, its dimension necessarily is changed. To alleviate the possibility of having a radial distance to the cutting edge different from that desired, blocks may be placed under the teeth 13 in channels 12 to give the required accurate diametrical measurement at the cutting edges.

The invention herein described may be manufactured and used by or for the Government of the United States of America for governmental purposes without the payment of any royalties thereon or therefor.

Having thus described my invention, I claim:

In a hob having a parallel-channeled body, individual supporting cogs erected from the periphery of the body between the channels and offset from each other in helical order, each cog having a substantially radial leading surface parallel with the axis of the body and coincident with the back of the respective channel and having lagging surfaces of which a primary portion is substantially normal to the leading surface of the posterior cog and a rear face portion declines sharply to a juncture with the body spaced forwardly from the posterior channel, a cutting tooth superimposed on said substantially radial leading surface and based on the bottom of the respective channel against the front of which channel the leading surface of the tooth is adapted to be kept for the maintenance of its cutting edge in a predeterminedly oriented cutting position, a wedge shaped to and fitted against the confronting sharply declined rear face portion of a posterior cog and the leading surface of its cutting tooth, the outermost surface of the wedge being substantially plane to said primary portion thereby to provide a common chip relief, the sides of both the cog and wedge having individual tapers revealing a cutting boundary for the posterior cutting tooth, and fastening means driven into the wedge flush with its outermost surface and into the body substantially at the foregoing juncture.

STEPHEN M. STAFFORD.

REFERENCES CITED

The following references are of record in the file of this patent:

UNITED STATES PATENTS

| Number | Name | Date |
|---|---|---|
| 263,299 | Albro | Aug. 22, 1882 |
| 1,315,536 | Usher | Sept. 9, 1919 |
| 1,315,978 | McQueston | Sept. 16, 1919 |
| 1,495,067 | Conklin | May 20, 1924 |
| 1,514,709 | Lyon | Nov. 11, 1924 |
| 1,885,686 | Cone | Nov. 1, 1932 |
| 2,257,169 | Hopps | Sept. 30, 1941 |
| 2,278,274 | Lind | Mar. 31, 1942 |
| 2,310,826 | Adams | Feb. 9, 1943 |
| 2,328,494 | Reaney | Aug. 31, 1943 |

FOREIGN PATENTS

| Number | Country | Date |
|---|---|---|
| 129,580 | Great Britain | July 17, 1919 |
| 282,077 | Germany | Feb. 15, 1915 |